(12) United States Patent
Wu et al.

(10) Patent No.: US 12,476,321 B2
(45) Date of Patent: Nov. 18, 2025

(54) BATTERY CELL, BATTERY, AND ELECTRICAL DEVICE

(71) Applicant: CONTEMPORARY AMPEREX TECHNOLOGY CO., LIMITED, Ningde (CN)

(72) Inventors: Kai Wu, Ningde (CN); Xiaobo Chen, Ningde (CN); Sike Liu, Ningde (CN); Mingguang Gu, Ningde (CN); Jingfeng Bai, Ningde (CN)

(73) Assignee: CONTEMPORARY AMPEREX TECHNOLOGY LIMITED, Ningde (CN)

( * ) Notice: Subject to any disclaimer, the term of this patent is extended or adjusted under 35 U.S.C. 154(b) by 0 days.

(21) Appl. No.: 19/216,009

(22) Filed: May 22, 2025

(65) Prior Publication Data

US 2025/0286206 A1    Sep. 11, 2025

Related U.S. Application Data

(63) Continuation of application No. PCT/CN2023/111081, filed on Aug. 3, 2023.

(30) Foreign Application Priority Data

May 31, 2023    (CN) .......................... 202310636914.6

(51) Int. Cl.
*H01M 50/107*    (2021.01)
*H01M 50/103*    (2021.01)
(Continued)

(52) U.S. Cl.
CPC ..... *H01M 50/3425* (2021.01); *H01M 50/103* (2021.01); *H01M 50/107* (2021.01); *B60L 50/64* (2019.02); *H01M 2220/20* (2013.01)

(58) Field of Classification Search
CPC .......... H01M 50/3425; H01M 50/107; H01M 50/103; H01M 2220/20
See application file for complete search history.

(56) References Cited

U.S. PATENT DOCUMENTS

2022/0367968 A1    11/2022    Jin et al.

FOREIGN PATENT DOCUMENTS

| CN | 111933833 A | 11/2020 |
|---|---|---|
| CN | 215680848 U | 1/2022 |

(Continued)

OTHER PUBLICATIONS

International Search Report and Written Opinion for Application No. PCT/CN2023/111081, mailed on Dec. 13, 2023, 8 pages.

*Primary Examiner* — Jane J Rhee
(74) *Attorney, Agent, or Firm* — Ladas & Parry LLP

(57) ABSTRACT

The battery cell includes a shell, the shell has a wall portion, the wall portion includes a weak portion, and the weak portion is configured to be destroyed when the battery cell releases internal pressure. An outer surface of the wall portion has a center point. A maximum distance between a projection of the weak portion on the outer surface of the wall portion and the center point is a, the minimum radial dimension of the outer surface of the wall portion is A, and a and A satisfy: a≤0.4A. By setting a≤0.4A, the weak portion is arranged at a region, with a relatively low stiffness, of the wall portion. When the battery cell releases the internal pressure, the region undergoes a large deformation under the action of gas, and therefore the weak portion arranged at the region is easily damaged.

20 Claims, 7 Drawing Sheets

(51) Int. Cl.
*H01M 50/342* (2021.01)
*B60L 50/64* (2019.01)

(56) References Cited

FOREIGN PATENT DOCUMENTS

| | | |
|---|---|---|
| CN | 217158533 U | 8/2022 |
| CN | 115663389 A | 1/2023 |
| CN | 115832596 A | 3/2023 |

BATTERY CELL, BATTERY, AND ELECTRICAL DEVICE

CROSS-REFERENCE TO RELATED APPLICATIONS

This application is a continuation of International application PCT/CN2023/111081 filed on Aug. 3, 2023 that claims the priority to Chinese Patent Application No. 202310636914.6 filed on May 31, 2023. The content of these applications is incorporated herein by reference in its entirety.

TECHNICAL FIELD

The present application relates to the field of batteries, and in particular, to a battery cell, a battery, and an electrical device.

BACKGROUND

Batteries are very widely used in the field of new energy, such as electric vehicles or new energy vehicles. New energy vehicles and electric vehicles have become a new development trend in the automobile industry. A battery is provided with a pressure relief mechanism for relieving internal pressure when the internal pressure of the battery reaches a fracture initiation pressure. However, the pressure relief mechanism is often opened prematurely, causing the normal pressure relief function to fail.

SUMMARY OF THE INVENTION

An objective of embodiments of the present application is to provide a battery cell, a battery, and an electrical device, which are intended to alleviate the problem in the related art of the pressure relief mechanism being often opened prematurely, causing the normal pressure relief function to fail.

In a first aspect, an embodiment of the present application provides a battery cell, where the battery cell includes a shell, the shell has a wall portion, the wall portion includes a weak portion, the weak portion is configured to be destroyed when the battery cell releases internal pressure, and an outer surface of the wall portion has a center point; where a maximum distance between a projection of the weak portion on the outer surface of the wall portion and the center point is a, the minimum radial dimension of the outer surface of the wall portion is A, a and A satisfy: a≤0.4A, and the radial direction refers to a direction passing through the center point.

In the above technical solution, by setting a≤0.4A, namely, the maximum distance between the projection of the weak portion on the outer surface of the wall portion and the center point of the outer surface of the wall portion is less than or equal to 0.4 times the minimum radial dimension of the outer surface of the wall portion, the weak portion is arranged in a first region, with a relatively small stiffness, of the wall portion. The first region is a circular region with the center point of the outer surface of the wall portion as a circle center and 0.4 times the minimum radial dimension of the outer surface of the wall portion as a radius. The first region is close to the center of the wall portion, and the first region is a region, with a relatively small stiffness, of the wall portion and thus has a relatively weak ability to resist deformation. When the battery cell releases the internal pressure, the first region undergoes a large deformation under the action of gas, and therefore the weak portion arranged in the first region is easily deformed and damaged. Therefore, under the condition of the same fracture initiation pressure, the thickness of the weak portion arranged in the first region can be larger. In this way, when the battery cell is normally used, the weak portion has a stronger ability to resist external impact, which is helpful to reduce the risk of the weak portion being damaged prematurely. Furthermore, the thicker the weak portion is, the easier it is to manufacture, and the lower the precision requirement for a manufacturing device.

As an optional technical solution of the embodiment of the present application, the wall portion is provided with a score groove, and the weak portion is formed at a bottom of the score groove.

In the above technical solution, the weak portion is formed by forming the score groove in the wall portion, with operation simple and convenient and costs low.

As an optional technical solution of the embodiment of the present application, the projection of the weak portion on the outer surface of the wall portion passes through the center point.

In the above technical solution, when the battery cell releases the internal pressure, the center point is a position, with the largest deformation, of the wall portion and is most likely to be damaged. By making the projection of the weak portion on the outer surface of the wall portion pass through the center point, the thickness of the weak portion at the center point can be larger. In this way, when the battery cell is normally used, the weak portion has a stronger ability to resist external impact, so as to reduce the risk of the weak portion being damaged prematurely.

As an optional technical solution of the embodiment of the present application, the weak portion has a weak point arranged corresponding to the center point, the thickness of the weak portion at the weak point is a first thickness, the maximum thickness of the weak portion at other positions than the weak point is a second thickness, and the first thickness is greater than or equal to the second thickness.

In the above technical solution, the first thickness is greater than the second thickness, namely, the thickness of the weak portion at the weak point is greater than the maximum thickness of the weak portion at other positions than the weak point. The thickness of the weak portion at the weak point is greater than the thickness of the weak portion at other positions, and the weak point has a stronger ability to resist external impact, so as to reduce the risk of the weak portion being damaged prematurely. The first thickness is equal to the second thickness, namely, the thickness of the weak portion at the weak point is equal to the maximum thickness of the weak portion at other positions than the weak point. In this way, the thickness of the weak portion is relatively more uniform, thereby facilitating processing and manufacturing.

As an optional technical solution of the embodiment of the present application, the score groove includes at least one groove section, the weak portion includes at least one weak section, and the at least one groove section and the at least one weak section are arranged in a one-to-one correspondence.

In the above technical solution, each time one groove section is arranged on the wall portion, one weak section is formed correspondingly. During manufacturing, quick forming can be achieve by stamping or milling, with operations simple and convenient and costs low.

As an optional technical solution of the embodiment of the present application, the at least one weak section includes at least one first weak section, the weak point is arranged at the first weak section, the thickness of the first weak section at the weak point is the first thickness, the thickness of the first weak section at other positions than the weak point is a third thickness, and the first thickness is greater than or equal to the third thickness.

In the above technical solution, the first thickness is greater than the third thickness, namely, the thickness of the first weak section at the weak point is greater than the thickness of the first weak section at other positions than the weak point. The thickness of the first weak section at the weak point is greater than the thickness of the first weak section at other positions, and therefore the weak point has a stronger ability to resist external impact, so as to reduce the risk of the weak portion being damaged prematurely. The first thickness is equal to the third thickness, namely, the thickness of the first weak section at the weak point is equal to the thickness of the first weak section at other positions than the weak point. In this way, the thickness of the first weak section is relatively more uniform, thereby facilitating processing and manufacturing.

As an optional technical solution of the embodiment of the present application, the at least one weak section further includes a second weak section and a third weak section, the second weak section and the third weak section are arranged opposite to each other and spaced apart, the first weak section is configured to connect the second weak section and the third weak section, the thickness of the second weak section and the thickness of the third weak section are both a fourth thickness, and the fourth thickness is less than the third thickness.

In the above technical solution, when the battery cell releases the pressure, the weak portion can be opened along the first weak section, the second weak section, and the third weak section, forming a larger pressure relief area, which is beneficial to improve a pressure relief rate. The first weak section is closer to the center of the first region than the second weak section and the third weak section. The thickness of the first weak section at other positions than the weak point may also be greater than the thickness of the second weak section and the third weak section, thereby improving the ability of the weak portion to resist external impact and reducing the risk of the weak portion being damaged prematurely.

As an optional technical solution of the embodiment of the present application, one end of the first weak section is connected to a middle of the second weak section, the other end of the first weak section is connected to a middle of the third weak section, and the weak point is located at a midpoint of the first weak section.

In the above technical solution, when the battery cell releases the pressure, after being destroyed, the weak point can rupture along the first weak section toward the second weak section and the third weak section, respectively. After reaching a point of intersection of the first weak section and the second weak section, the weak point ruptures from the point of intersection in an extension direction of the second weak section toward both ends of the second weak section. After reaching a point of intersection of the first weak section and the third weak section, the weak point ruptures from the point of intersection in an extension direction of the third weak section toward both ends of the third weak section to achieve fast pressure relief.

As an optional technical solution of the embodiment of the present application, the second weak section includes a first end and a second end, the third weak section includes a third end and a fourth end, the first end and the third end are arranged opposite to each other, the second end and the fourth end are arranged opposite to each other, the first weak section is configured to connect the first end and the fourth end or connect the second end and the third end, and the weak point is located at the midpoint of the first weak section.

In the above technical solution, when the battery cell releases the pressure, after being destroyed, the weak point can rupture along the first weak section toward the second weak section and the third weak section, respectively. After reaching the point of intersection of the first weak section and the second weak section, the weak point ruptures from the point of intersection in the extension direction of the second weak section toward the other end of the second weak section. After reaching the point of intersection of the first weak section and the third weak section, the weak point ruptures from the point of intersection in the extension direction of the third weak section toward the other end of the third weak section so as to achieve fast pressure relief.

As an optional technical solution of the embodiment of the present application, the at least one weak section further includes a fourth weak section and a fifth weak section, the fourth weak section and the fifth weak section are arranged opposite to each other and spaced apart, the second weak section and the fourth weak section intersect at the first end, the third weak section and the fifth weak section intersect at the second end, the first weak section is configured to connect the first end and the second end, and the weak point is located at the midpoint of the first weak section.

In the above technical solution, when the battery cell release the pressure, after being destroyed, the weak point can rupture along the first weak section toward the first end and the second end, respectively. After reaching the first end, the weak point ruptures from the first end along the second weak section and the fourth weak section, respectively. After reaching the second end, the weak point ruptures from the second end along the third weak section and the fourth weak section, respectively, to achieve fast pressure relief.

As an optional technical solution of the embodiment of the present application, the at least one weak section further includes a sixth weak section, and the first weak section and the sixth weak section intersect at the weak point.

In the above technical solution, when the weak point serves as a point of intersection of the first weak section and the sixth weak section, the weak point has a more concentrated stress and thus is more likely to rupture. Therefore, the thickness of the weak portion at the weak point can be set larger, so that when the battery cell is normally used, the weak point has a stronger ability to resist external impact, so as to reduce the risk of the weak portion being damaged prematurely.

As an optional technical solution of the embodiment of the present application, the projection of the weak portion on the outer surface of the wall portion is a closed structure, and the closed structure surrounds the center point.

In the above technical solution, the weak portion is configured as the closed structure extending along a closed trajectory, so that when the internal pressure of the battery cell reaches the fracture initiation pressure, the internal pressure can push open the weak portion from all sides, forming a larger opening and allowing faster and easier pressure relief.

As an optional technical solution of the embodiment of the present application, in a thickness direction of the wall portion, the center of the projection of the weak portion coincides with the center point.

In the above technical solution, when the weak point coincides with the center point, the weak point has the largest deformation when the battery cell releases the pressure and thus is most likely to rupture. Therefore, the thickness of the weak portion at the weak point can be set larger so that when the battery cell is normally used, the weak point has a stronger ability to resist external impact, so as to reduce the risk of the weak portion being damaged prematurely.

As an optional technical solution of the embodiment of the present application, in the thickness direction of the wall portion, the center of the projection of the weak portion deviates from the center point.

In the above technical solution, by making the center of the projection of the weak portion in the thickness direction deviate from the center point, it is beneficial to improve the creep resistance of the weak portion.

As an optional technical solution of the embodiment of the present application, a distance at which the center of the projection of the weak portion in the thickness direction deviates from the center point is B, which satisfies: $0<B\leq 5$ mm.

In the above technical solution, by limiting the distance at which the center of the projection of the weak portion in the thickness direction deviates from the center point in the range of 0-5 mm (excluding 0), the weak portion has better creep resistance.

As an optional technical solution of the embodiment of the present application, $0<B\leq 3$ mm.

In the above technical solution, by limiting the distance at which the center of the projection of the weak portion in the thickness direction deviates from the center point in the range of 0-3 mm (excluding 0), the weak portion has better creep resistance. At the same time, the thickness of the weak portion is relatively large, so that when the battery cell is normally used, the weak portion has a stronger ability to resist external impact, which is beneficial to reduce the risk of the weak portion being damaged prematurely.

As an optional technical solution of the embodiment of the present application, the wall portion includes a main body portion, and the weak portion and the main body portion are integrally formed.

In the above technical solution, integrally forming the weak portion with the main body portion can improve the stiffness of the weak portion, so that the weak portion has a stronger ability to resist creep and impact of an electrolytic solution, which is beneficial to prolong the service life of the weak portion and reduce the risk of liquid leakage occurring to the weak portion.

As an optional technical solution of the embodiment of the present application, the hardness of the weak portion is greater than that of the main body portion.

In the above technical solution, the weak portion can be formed by stamping, so that the weak portion will undergo cold work hardening (the grain arrangement changes, resulting in lattice distortion, reducing the metal plasticity, and increasing the material hardness). The hardness of the weak portion will be greater than that of the main body portion, so that the weak portion has an enhanced ability to resist external impact, and is not likely to be damaged by external impact. In addition, the weak portion has an enhanced ability to resist fatigue and is less likely to fail due to fatigue.

As an optional technical solution of the embodiment of the present application, the wall portion includes a main body portion and a pressure relief mechanism, the pressure relief mechanism is arranged separately from the main body portion and connected thereto, the weak portion is arranged on the pressure relief mechanism, and an outer surface of the main body portion is the outer surface of the wall portion.

In the above technical solution, the pressure relief mechanism is arranged separately from the main body portion and installed on the main body portion, so as to facilitate processing and manufacturing.

As an optional technical solution of the embodiment of the present application, the shell includes a case and an end cover, the case has an opening, and the end cover closes the opening and is fixed to the case; and the wall portion is the end cover or a wall of the case.

In the above technical solution, the wall portion may be the end cover, or a bottom wall of the case, or a side wall of the case, and the weak portion is arranged in the first region of the end cover, the bottom wall or the side wall. Under the condition of the same fracture initiation pressure, the thickness of the weak portion arranged in the first region can be larger. In this way, when the battery cell is normally used, the weak portion has a stronger ability to resist external impact, which is helpful to reduce the risk of the weak portion being damaged prematurely.

In a second aspect, an embodiment of the present application further provides a battery, including the above battery cell.

In a third aspect, an embodiment of the present application further provides an electrical device, including the above battery, where the battery is configured to provide electrical energy for the electrical device.

DESCRIPTION OF THE DRAWINGS

To more clearly describe the technical solutions of the embodiments of the present application, the drawings to be used in the embodiments will be briefly introduced below, and it should be understood that the following drawings only show some embodiments of the present application, and therefore should not be considered as limiting the scope of the present application. For those of ordinary skills in the art, other relevant drawings may also be obtained based on these drawings without creative efforts.

Figure 1:
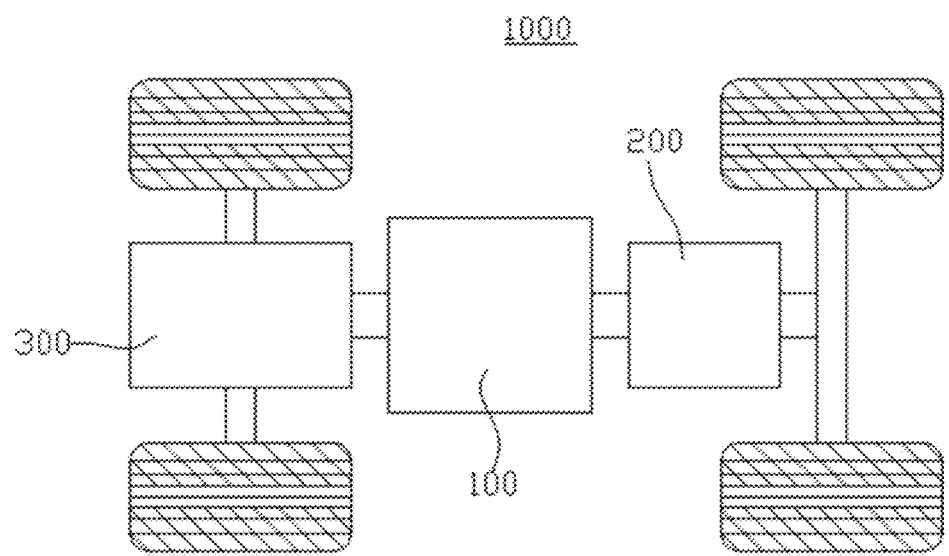
FIG. 1 is a schematic structural diagram of a vehicle provided in some embodiments of the present application.

Reference numerals: 10—box body; 11—first portion; 12—second portion; 20—battery cell; 21—weak portion; 211—first weak section; 2111—weak point; 212—second weak section; 2121—first end; 2122—second end; 213—third weak section; 2131—third end; 2132—fourth end; 214—fourth weak section; 215—fifth weak section; 216—sixth weak section; 22—shell; 221—wall portion; 2211—first region; 2212—score groove; 2213—center point; 222—case; 2221—side wall; 2222—bottom wall; 223—end cover; 23—electrode terminal; 100—battery; 200—controller; 300—motor; 1000—vehicle.

DETAILED DESCRIPTION

In order to make the objects, technical solutions and advantages of embodiments of the present application clearer, the technical solutions in the embodiments of the present application will be clearly described below with reference to the drawings for the embodiments of the present application. Apparently, the described embodiments are some of, rather than all of, the embodiments of the present application. All the other embodiments obtained by a person of ordinary skill in the art based on the embodiments of the present application without any creative effort shall fall within the scope of protection of the present application.

Unless otherwise defined, all technical and scientific terms used in the present application shall have the same meanings as those generally understood by those skilled in the art of the present application. The terms used in the present application in the specification of application are merely for the purpose of describing specific embodiments and are not intended to limit the present application. The terms "include" and "have" and any variations thereof in the specification and claims and the above brief description of the drawings of the present application are intended to cover non-exclusive inclusion. The terms "first," "second," etc. in the specification and the claims of the present application as well as the above drawings are used to distinguish different objects, rather than to describe a specific order or primary-secondary relationship.

The phrase "embodiment" referred to in the present application means that the descriptions of specific features, structures, and characteristics in combination with the embodiment are included in at least one embodiment of the present application. The appearance of this phrase in various places in the specification does not necessarily refer to the same embodiment, nor is it a separate or alternative embodiment that is mutually exclusive with other embodiments.

In the description of the present application, it should be noted that the terms "mounting," "connecting," "connection" and "attachment" should be understood in a broad sense, unless otherwise explicitly specified or defined, for example, it may be a fixed connection, a detachable connection or an integrated connection; and may be a direct connection or an indirect connection through an intermediate medium, or may be a communication between the interior of two elements. For those of ordinary skill in the art, the specific meanings of the above terms in the present application can be understood according to specific situations.

In the present application, the term "and/or" is only an association relation describing associated objects, which means that there may be three relations, for example, A and/or B may represent three situations: A exists alone, both A and B exist, and B exists alone. In addition, the character "/" in the present application generally means that the associated objects before and after it are in an "or" relationship.

In the embodiments of the present application, the same reference signs denote the same components, and for the sake of brevity, detailed descriptions of the same components are omitted in different embodiments. It should be understood that the thickness, length, width and other dimensions of the various components in the embodiments of the present application shown in the drawings, as well as the overall thickness, length, width and other dimensions of an integrated apparatus, are for illustrative purposes only, and should not constitute any limitation to the present application.

In the present application, the phrase "a plurality of" means two or more.

In the present application, the battery cell may include a lithium-ion secondary battery, a lithium-ion primary battery, a lithium sulfur battery, a sodium lithium-ion battery, a sodium-ion battery or a magnesium-ion battery and so on. This is not limited in the embodiments of the present application. The battery cell may be in a cylindrical shape, a flat shape, a cuboid shape or another shape, which is also not limited in the embodiments of the present application. The battery cells are generally classified into three types depending on the way of encapsulation: cylindrical battery cells, prismatic battery cells and pouch battery cells, which are also not limited in the embodiments of the present application.

The battery mentioned in the embodiments of the present application refers to a single physical module including one or more battery cells to provide a higher voltage and capacity. For example, the battery mentioned in the present application may include a battery module, a battery pack, or the like. The battery generally includes a box for packaging one or more battery cells. The box can prevent liquid or other foreign matters from affecting charging or discharging of the battery cells.

The battery cell includes an electrode assembly and an electrolytic solution, and the electrode assembly is composed of a positive electrode plate, a negative electrode plate, and a separator. The operation of the battery cell mainly relies on the movement of metal ions between the positive electrode plate and the negative electrode plate. The positive electrode plate includes a positive electrode current collector and a positive electrode active material layer, a surface of the positive electrode current collector is coated with the positive electrode active material layer, the positive electrode current collector not coated with the positive electrode active material layer protrudes from the positive electrode current collector already coated with the positive electrode active material layer, and the positive electrode current collector not coated with the positive electrode active material layer is used as a positive tab. Taking a lithium-ion battery as an example, the material of the positive electrode current collector may be aluminum, and the positive electrode active material may be lithium cobalt oxide, lithium iron phosphate, ternary lithium, lithium manganate, or the like. The negative electrode plate includes a negative electrode current collector and a negative electrode active material layer, a surface of the negative electrode current collector is coated with the negative electrode active material layer, the negative electrode current collector not coated with the negative electrode active material layer protrudes from the negative electrode current collector already coated with the negative electrode active material layer, and the negative electrode current collector not coated with the negative electrode active material layer is used as a negative tab. The material of the negative electrode current collector may be copper, and the negative electrode active material may be, e.g., carbon or silicon. In order to ensure that no fusing occurs when a large current passes, there are a plurality of positive tabs which are stacked together, and there are a plurality of negative tabs which are stacked together. The material of the separator may be, e.g., polypropylene (PP) or polyethylene (PE). In addition, the electrode assembly may have a winded structure or a stacked structure, but the embodiments of the present application are not limited thereto.

For development of a battery technology, design factors of many aspects should be considered at the same time, such as the energy density, the cycle life, the discharging capacity, the charging-discharging rate, and other performance parameters. In addition, the reliability of the battery should also be considered.

For a battery cell, in order to ensure the reliability of the battery cell, a shell of the battery cell may be provided with a pressure relief mechanism. For example, an end cover is provided with a weak portion. When the internal pressure of the battery cell reaches a fracture initiation pressure, the weak portion is destroyed to relieve the internal pressure of the battery cell to reduce the risk of explosion or fire of the battery cell. However, the weak portion is often opened prematurely, causing the normal pressure relief function to fail.

The shell of the battery cell is easily subjected to external impact, which can easily act on the weak portion, and then the weak portion is opened prematurely, causing the normal pressure relief function to fail.

In view of this, embodiments of the present application provide a battery cell, where the battery cell includes a shell, the shell has a wall portion, the wall portion includes a weak portion, and the weak portion is configured to be destroyed when the battery cell releases internal pressure. An outer surface of the wall portion has a center point. A maximum distance between a projection of the weak portion on the outer surface of the wall portion and the center point is a, the minimum radial dimension of the outer surface of the wall portion is A, and a and A satisfy: a≤0.4A. The radial direction refers to a direction passing through the center point.

By setting a≤0.4A, namely, the maximum distance between the projection of the weak portion on the outer surface of the wall portion and the center point of the outer surface of the wall portion is less than or equal to 0.4 times the minimum radial dimension of the outer surface of the wall portion, the weak portion is arranged in a first region, with a relatively small stiffness, of the wall portion. The first region is a circular region with the center point of the outer surface of the wall portion as a circle center and 0.4 times the minimum radial dimension of the outer surface of the wall portion as a radius. The first region is close to the center of the wall portion, and the first region is a region, with a relatively small stiffness, of the wall portion and thus has a relatively weak ability to resist deformation. When the battery cell releases the internal pressure, the first region undergoes a large deformation under the action of gas, and therefore the weak portion arranged in the first region is easily deformed and damaged. Therefore, under the condition of the same fracture initiation pressure, the thickness of the weak portion arranged in the first region can be larger. In this way, when the battery cell is normally used, the weak portion has a stronger ability to resist external impact, which is helpful to reduce the risk of the weak portion being damaged prematurely. Furthermore, the thicker the weak portion is, the easier it is to manufacture, and the lower the precision requirement for a manufacturing device.

The technical solutions described in the embodiments of the present application are applicable to batteries and electrical devices using the batteries.

The electrical device may be a vehicle, a mobile phone, a portable device, a laptop, a ship, a spacecraft, an electric toy, an electric tool, etc. The spacecraft includes an airplane, a rocket, a space shuttle, or a spaceship. The electric toy includes a fixed or mobile electric toy, such as a game console, an electric vehicle toy, an electric ship toy, and an electric airplane toy. The electric tool includes an electric tool for metal cutting, an electric tool for grinding, an electric tool for assembling and an electric tool for railways, such as an electric drill, an electric grinder, an electric wrench, an electric screwdriver, an electric hammer, an electric impact drill, a concrete vibrator, and an electric planer. The electrical device is not specially limited in the embodiments of the present application.

For the convenience of illustration, the following embodiments are illustrated with the electrical device being a vehicle 1000 as an example.

Referring to FIG. 1, FIG. 1 is a schematic structural diagram of a vehicle 1000 provided in some embodiments of the present application. The vehicle 1000 may be a fuel vehicle, a gas vehicle or a new energy vehicle. The new energy vehicle may be an all-electric vehicle, a hybrid vehicle, an extended-range vehicle, or the like. A battery 100 is arranged in the vehicle 1000. The battery 100 may be arranged at the bottom or head portion or tail portion of the vehicle 1000. The battery 100 may be used as a power supply for the vehicle 1000, for example, the battery 100 may be used as an operating power source for the vehicle 1000. The vehicle 1000 may further include a controller 200 and a motor 300. The controller 200 is configured to control the battery 100 to supply power to the motor 300, for example, to supply power for starting, navigation and driving of the vehicle 1000.

In some embodiments of the present application, the battery 100 not only may serve as an operating power source of the vehicle 1000, but also may serve as a driving power source of the vehicle 1000, thus replacing or partially replacing fuel or natural gas to provide driving power for the vehicle 1000.

Figure 2:
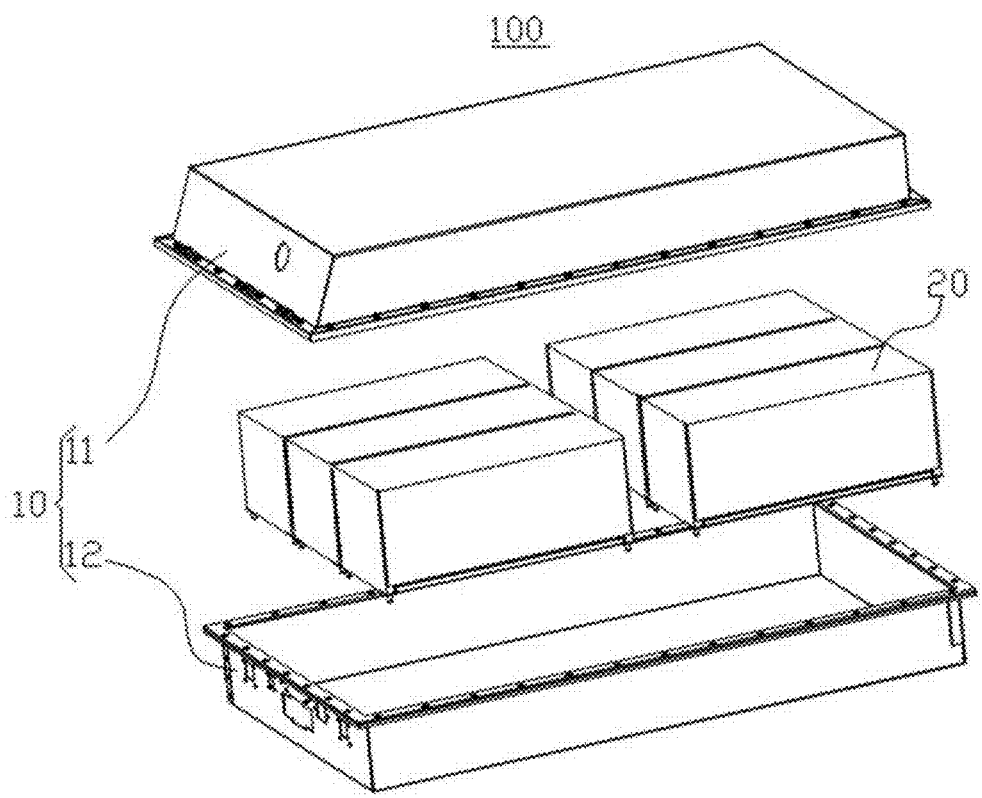
FIG. 2 is an exploded view of a battery provided by some embodiments of the present application.

Referring to FIG. 2, FIG. 2 is an exploded view of a battery 100 provided in some embodiments of the present application. The battery 100 comprises a box body 10 and a battery cell 20, wherein the battery cell 20 is accommodated within the box body 10. The box body 10 is used to provide an accommodating space for the battery cell 20, and the box body 10 can be of various structures. In some embodiments, the box body 10 may include a first part 11 and a second part 12, the first part 11 and the second part 12 covering each other, and the first part 11 and the second part 12 together defining the accommodating space for accommodating the battery cell 20. The second part 12 may be of a hollow structure with an opening at one end, and the first part 11 may be of a plate-like structure, where the first part 11 covers the opening side of the second part 12 so that the first part 11 and the second part 12 together define the accommodation space. The first part 11 and the second part 12 may each be of a hollow structure with an opening at one end, where the opening side of the first part 11 covers the opening side of the second part 12. Of course, the box body 10 formed by the first part 11 and the second part 12 may be of a variety of shapes, such as a cylinder and a rectangular solid.

In the battery 100, there may be a plurality of battery cells 20, and the plurality of battery cells 20 may be connected in series or in parallel or in parallel-series, where the parallel-series connection means that the plurality of battery cells 20 are connected in both series and parallel. The plurality of battery cells 20 may be directly connected together in series or in parallel or in parallel-series, and then the whole composed of the plurality of battery cells 20 may be accommodated in the box body 10. Of course, the battery 100 may also be in the form of a battery module first formed by the plurality of battery cells 20 being connected in series or in parallel or in parallel-series, then the plurality of battery modules may be connected in series or in parallel or in parallel-series to form a whole, and accommodated in the box body 10. The battery 100 may further include other structures. For example, the battery 100 may further include a bus component for electrically connecting the plurality of battery cells 20.

Each battery cell 20 may be a secondary battery cell or a primary battery cell; or may be a lithium-sulfur battery cell, a sodium-ion battery cell or a magnesium-ion battery cell, but is not limited thereto. The battery cell 20 can be in a cylinder shape, a flat body shape, a cuboid shape or other shapes.

Figure 3:
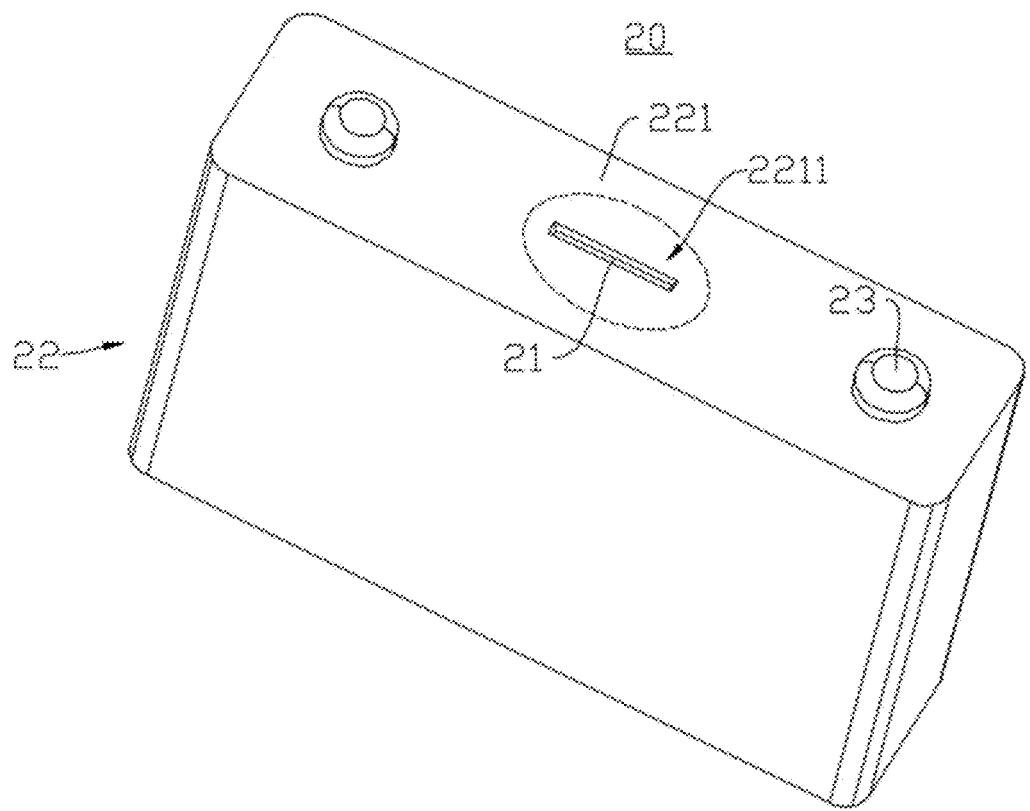
FIG. 3 is a schematic structural view of a battery cell according to some embodiments of the present application.
Figure 4:
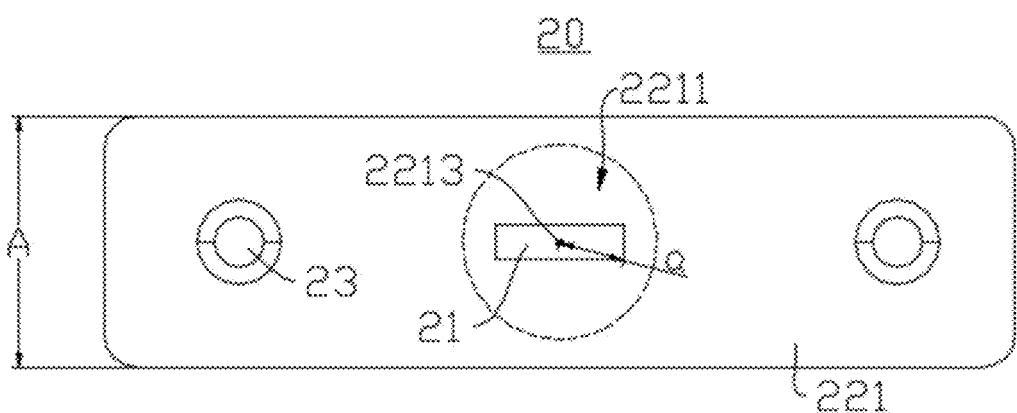
FIG. 4 is a top view of the battery cell according to some embodiments of the present application.
Figure 5:
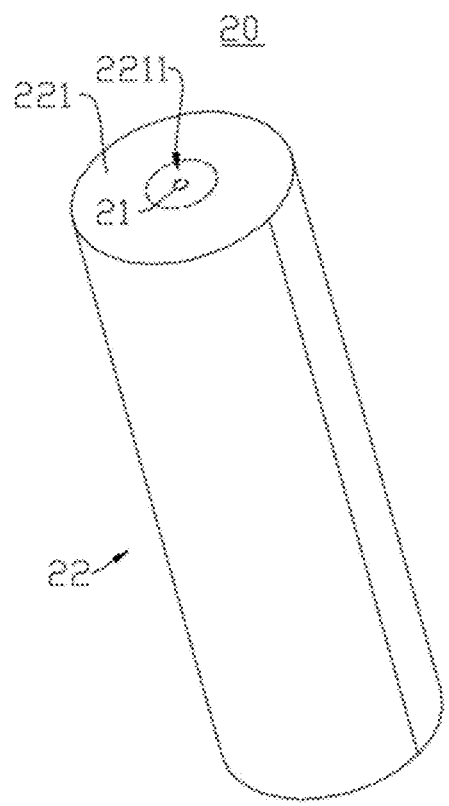
FIG. 5 is a schematic structural view of a battery cell according to some further embodiments of the present application.
Figure 6:
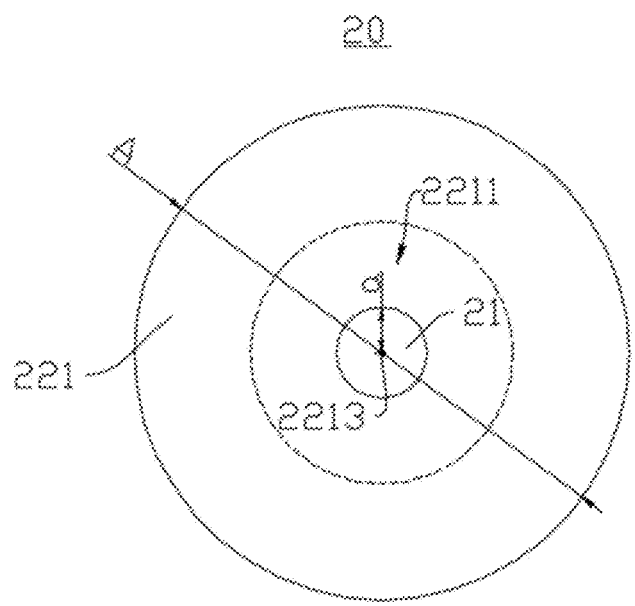
FIG. 6 is a top view of the battery cell according to some further embodiments of the present application.

Referring to FIG. 3, FIG. 4, FIG. 5, and FIG. 6, FIG. 3 is a schematic structural view of a battery cell 20 according to some embodiments of the present application. FIG. 4 is a top view of the battery cell 20 according to some embodiments of the present application. FIG. 5 is a schematic structural view of a battery cell 20 according to some further embodiments of the present application. FIG. 6 is a top view of the battery cell 20 according to some further embodiments of the present application. Embodiments of the present application provides a battery cell 20, where the battery cell 20 includes a shell 22, the shell 22 has a wall portion 221, the wall portion 221 includes a weak portion 21, and the weak portion 21 is configured to be destroyed when the battery cell 20 releases internal pressure. An outer surface of the wall portion 221 has a center point 2213. A maximum distance between a projection of the weak portion 21 on the outer surface of the wall portion 221 and the center point 2213 is a, the minimum radial dimension of the outer surface of the wall portion 221 is A, and a and A satisfy: a≤0.4A. The radial direction refers to a direction passing through the center point 2213.

The shell 22 includes an end cover 223 and a case 222. The case 222 has an accommodating space with one end open, and the accommodating space is configured to accommodate an electrode assembly. The end cover 223 is connected to the case 222 and configured to close the opening.

The end cover 223 is a component that covers the opening of the case 222 to isolate an internal environment of the battery cell 20 from an external environment. Without limitation, a shape of the end cover 223 may be adaptive to that of the case 222 so as to fit the case 222. Optionally, the end cover 223 may be made of a material (such as an aluminum alloy) with a certain hardness and strength, so that the end cover 223 is not likely to be deformed when being pressed and collided, the battery cell 20 can have a higher structural strength, and the reliability can also be improved. The end cover 223 may also be made of various materials, such as copper, iron, aluminum, stainless steel, an aluminum alloy, and plastic. This is not specially limited in the embodiments of the present application. In some embodiments, the battery cell 20 further includes an insulating member, the insulating member is arranged on an inner side of the end cover 223, and the insulating member may be configured to isolate an electrical connection component in the case 222 from the end cover 223, thereby reducing the risk of a short circuit. For example, the insulating member may be made of plastic, rubber, and the like.

The case 222 is a component configured to fit the end cover 223 to form the internal environment of the battery cell 20, where the formed internal environment may be configured to accommodate an electrode assembly 23, an electrolytic solution, and other components. The case 222 and the end cover 223 may be separate components, the opening may be formed in the case 222, and at the opening, the opening is covered with the end cover 223 so as to form the internal environment of the battery cell 20. Without limitation, the end cover 223 and the case 222 may also be integrated. Specifically, the end cover 223 and the case 222 may first form a common connection surface before other components enter the case. When the inside of the case 222 is required to be encapsulated, the case 222 is covered with the end cover 223. The case 222 may have various shapes and sizes, such as a cuboid shape, a cylinder shape, and a hexagonal prism shape. Specifically, the shape of the case 222 may be determined according to the specific shape and size of the electrode assembly 23. The case 222 may be made of various materials, such as copper, iron, aluminum, stainless steel, an aluminum alloy, and plastic, which is not particularly limited in the embodiments of the present application.

The electrode assembly is a component where an electrochemical reaction occurs in the battery cell 20. One or more electrode assemblies may be contained within the shell 22. The electrode assembly is mainly formed by winding or stacking a positive electrode plate and a negative electrode plate, and a separator is generally arranged between the positive electrode plate and the negative electrode plate. The portions of the positive electrode plate and the negative electrode plate that have active materials constitute a main body portion of the electrode assembly, and the portions of the positive electrode plate and the negative electrode plate that do not have active materials each constitute a tab. A positive electrode tab and a negative electrode tab may be co-located at one end of the main body portion or located at two ends of the main body portion, respectively. During charging and discharging of the battery 100, a positive electrode active material and a negative electrode active material react with the electrolyte solution.

An electrode terminal 23 may be arranged on the shell 22 and the electrode terminal 23 may be configured to be electrically connected to the electrode assembly, for outputting or inputting electrical energy of the battery cell 20. The electrode terminal 23 may be arranged on the end cover 223, or on the case 222. In the embodiments shown in FIG. 3, the electrode terminal 23 is arranged on the end cover 223.

The weak portion 21 is a structure which is configured to be opened to release the internal pressure of the battery cell 20 and reduce the risk of explosion or fire of the battery cell 20 when the internal pressure or temperature of the battery cell 20 reaches the fracture initiation pressure.

The shell 22 has a plurality of walls, such as a bottom wall 2222, side walls 2221, etc. Each wall of the shell 22 may serve as the wall portion 221. For example, the bottom wall 2222 may be the wall portion 221, and in this case, the weak portion 21 is arranged on the bottom wall 2222. For another example, the side wall 2221 may be the wall portion 221, and in this case, the weak portion 21 is arranged on the side wall 2221. Particularly, the end cover 223 can be used alone as a wall portion 221, and in this case, the weak portion 21 is arranged on the end cover 223. It should be noted that the shell 22 may have a plurality of wall portions 221, and in this case, each wall portion 221 is provided with the weak portion 21. For example, the bottom wall 2222 and the side wall 2221 are both the wall portions 221, and in this case, the bottom wall 2222 and the side wall 2221 are both provided with the weak portion 21.

An outer surface of the wall portion 221 has a center point 2213. Referring to FIG. 3 and FIG. 4, taking the wall portion 221 as a rectangular structure as an example, the center point 2213 of the outer surface of the wall portion 221 is a point of intersection of diagonal lines of the rectangle. Referring to FIG. 5 and FIG. 6, taking the wall portion 221 as a circular structure as an example, the center point 2213 of the outer surface of the wall portion 221 is the center of the circle.

a represents the maximum distance between the projection of the weak portion 21 on the outer surface of the wall portion 221 and the center point 2213, namely, a distance between a point, farthest from the center point 2213, in the projection of the weak portion 21 on the outer surface of the wall portion 221 and the center point 2213. For example, the weak portion 21 is circular, and the center of the circle coincides with the center point 2213. In this case, the maximum distance between the projection of the weak portion 21 on the outer surface of the wall portion 221 and the center point 2213 is the radius of the circle corresponding to the weak portion 21. For another example, the weak portion 21 is circular, any point on the weak portion 21 coincides with the center point 2213. In this case, the maximum distance between the projection of the weak portion 21 on the outer surface of the wall portion 221 and the center point 2213 is the diameter of the circle corresponding to the weak portion 21.

A represents the minimum radial dimension of the outer surface of the wall portion 221. "The minimum radial dimension of the outer surface of the wall portion 221" refers to the dimension of a shortest linear segment among a plurality of linear segments that have any two points on the edge of the wall portion 221 as endpoints and pass through the center point 2213. Referring to FIG. 3 and FIG. 4, in the embodiments shown in FIG. 3 and FIG. 4, the outer surface of the wall portion 221 is in the shape of a rectangle, and the minimum radial dimension of the outer surface of the wall portion 221 is the width of the rectangle. Referring to FIG. 5 and FIG. 6, in the embodiments shown in FIG. 5 and FIG. 6, the outer surface of the wall portion 221 is in the shape of a circle, and the minimum radial dimension of the outer surface of the wall portion 221 is the diameter of the circle. For another example, in some embodiments, the outer surface of the wall portion 221 is in the shape of a regular hexagon, and the minimum radial dimension of the outer surface of the wall portion 221 is a distance between two parallel edges of the regular hexagon.

"The maximum distance between the projection of the weak portion 21 on the outer surface of the wall portion 221 and the center point 2213 is a, the minimum radial dimension of the outer surface of the wall portion 221 is A, and a and A satisfy: a≤0.4A" can be understood as: the weak portion 21 is located in the first region 2211 of the wall portion 221, and the edge of the weak portion 21 can overlap with the edge of the first region 2211, but cannot exceed the first region 2211. The first region 2211 is a circular region with the center point 2213 of the outer surface of the wall portion 221 as a circle center and 0.4 times the minimum radial dimension of the outer surface of the wall portion 221 as a radius. The first region 2211 is a region, close to the center of the wall portion 221, of the wall portion 221. Compared with a region close to the edge of the wall portion 221, the first region 2211 has a smaller stiffness. When the internal pressure of the battery cell 20 reaches the fracture initiation pressure, the first region 2211 has a large deformation.

Referring to FIG. 3, FIG. 4, FIG. 5, and FIG. 6, in FIG. 3, FIG. 4, FIG. 5, and FIG. 6, the boundary of the first region 2211 is shown by a dotted line, and the first region 2211 is a region defined by the dotted line. It should be noted that the dotted line is only used to show the boundary of the first region 2211 and does not mean that there are other physical structures blocked at the location of the dotted line.

By setting a≤0.4A, namely, the maximum distance between the projection of the weak portion 21 on the outer surface of the wall portion 221 and the center point 2213 of the outer surface of the wall portion 221 is less than or equal to 0.4 times the minimum radial dimension of the outer surface of the wall portion 221, the weak portion 21 is arranged in the first region 2211, with a relatively small stiffness, of the wall portion 221. The first region 2211 is a circular region with the center point 2213 of the outer surface of the wall portion 221 as a circle center and 0.4 times the minimum radial dimension of the outer surface of the wall portion 221 as a radius. The first region 2211 is close to the center of the wall portion 221, and the first region 2211 is a region, with a relatively small stiffness, of the wall portion 221 and thus has a relatively weak ability to resist deformation. When the battery cell 20 releases the internal pressure, the first region 2211 undergoes a large deformation under the action of gas, and therefore the weak portion 21 arranged in the first region 2211 is easily deformed and damaged. Therefore, under the condition of the same fracture initiation pressure, the thickness of the weak portion 21 arranged in the first region 2211 can be larger. In this way, when the battery cell 20 is normally used, the weak portion 21 has a stronger ability to resist external impact, which is beneficial to reduce the risk of the weak portion 21 being damaged prematurely. Furthermore, the thicker the weak portion 21 is, the easier it is to manufacture, and the lower the precision requirement for a manufacturing device.

Figure 7:
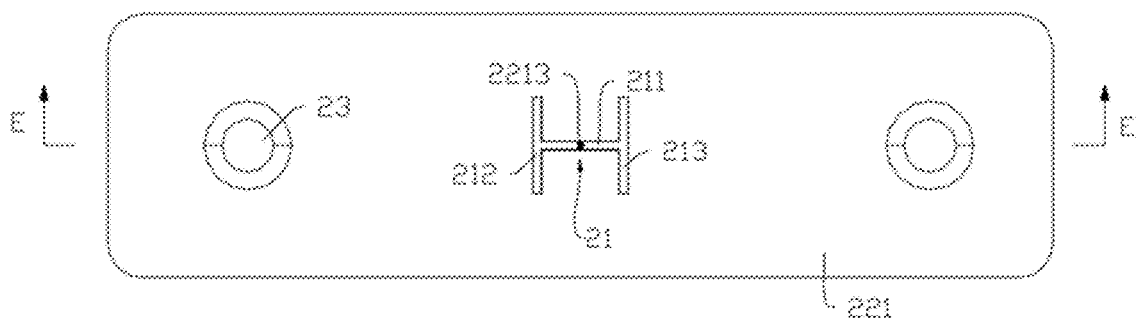
FIG. 7 is a top view of a battery cell according to some other embodiments of the present application.
Figure 8:
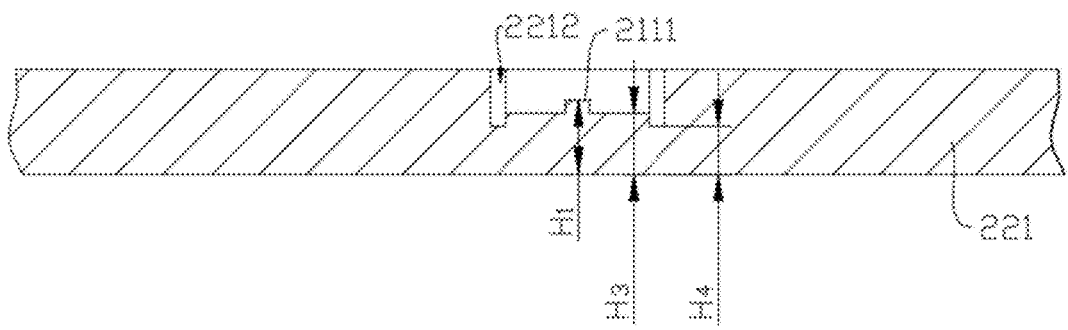
FIG. 8 is a sectional view taken along E-E in FIG. 7.

Referring to FIG. 7 and FIG. 8, FIG. 7 is a top view of a battery cell 20 according to some other embodiments of the present application. FIG. 8 is a sectional view taken along E-E in FIG. 7. In some embodiments, the wall portion 221 is provided with a score groove 2212, and the weak region 21 is formed at a bottom of the score groove 2212.

The score groove 2212 may be formed in a variety of ways, such as stamping, milling, etc. The score groove 2212 may be formed in a surface of the wall portion 221 facing the inside of the shell 22, or may be formed in a surface of the wall portion 221 facing away from the inside of the shell 22. Taking the wall portion 221 of a rectangular flat plate structure as an example, the wall portion 221 has opposite inner and outer surfaces in a thickness direction. The inner surface of the wall portion 221 faces the inside of the shell 22, and the outer surface of the wall portion 221 faces away from the inside of the shell 22. The score groove 2212 may be formed in the inner surface of the wall portion 221 or formed in the outer surface of the wall portion 221.

The score groove 2212 may be a groove recessed from the outer surface of the wall portion 221 in the thickness direction of the wall portion 221, and the weak portion 21 is a part, between the inner surface thereof and a bottom surface of the score groove 2212, of the wall portion 221.

The score groove 2212 may also be a groove recessed from the inner surface of the wall portion 221 in the thickness direction of the wall portion 221, and the weak portion 21 is a part, between the outer surface thereof and the bottom surface of the score groove 2212, of the wall portion 221.

The score groove 2212 is described as a groove sunken from the outer surface of the wall portion 221 in the thickness direction of the wall portion 221. Referring to FIG. 3 and FIG. 4, the score groove 2212 may be a linear groove extending along a linear trajectory. Referring to FIG. 5 and FIG. 6, the score groove 2212 may also be an annular groove extending along a closed trajectory.

The weak portion 21 is formed by forming the score groove 2212 in the wall portion 221, with operation simple and convenient and costs low.

Referring to FIG. 7 and FIG. 8, in some embodiments, the projection of the weak portion 21 on the outer surface of the wall portion 221 passes through the center point 2213.

"The projection of the weak portion 21 on the outer surface of the wall portion 221 passes through the center point 2213" may be understood as: the projection of the weak portion 21 on the outer surface of the wall portion 221 covers the center point 2213. The center point 2213 may be located at the edge of the projection of the weak portion 21 on the outer surface of the wall portion 221. For example, the weak portion 21 is of a linear structure, and the center point 2213 is located at one end of the projection of the weak portion 21 on the outer surface of the wall portion 221. The center point 2213 may be located at the middle of the projection of the weak portion 21 on the outer surface of the wall portion 221. For example, the weak portion 21 is of a linear structure, and the center point 2213 is located at a midpoint of the projection of the weak portion 21 on the outer surface of the wall portion 221.

When the battery cell 20 releases the internal pressure, the center point 2213 is a position, with the largest deformation, of the wall portion 221 and is most likely to be damaged. By making the projection of the weak portion 21 on the outer surface of the wall portion 221 pass through the center point 2213, the thickness of the weak portion 21 at the center point 2213 can be larger. In this way, when the battery cell 20 is normally used, the weak portion 21 has a stronger ability to resist external impact, so as to reduce the risk of the weak portion 21 being damaged prematurely.

Referring to FIG. 7 and FIG. 8, in some embodiments, the weak portion 21 has a weak point 2111 arranged corresponding to the center point 2213, and the thickness of the weak portion 21 at the weak point 2111 is a first thickness. The maximum thickness of the weak portion 21 at other positions than the weak point 2111 is a second thickness. The first thickness is greater than or equal to the second thickness.

The first thickness is the thickness of the weak portion 21 at the weak point 2111, or the thickness of the weak portion 21 at the location of the center point 2213. Referring to FIG. 8, $H_1$ is indicated as the first thickness in FIG. 8.

The second thickness is the maximum thickness of the weak portion 21 at other positions than the weak point 2111. Referring to FIG. 8, if $H_3$ in FIG. 8 is the maximum thickness of the weak portion 21 at other positions than the weak point 2111, $H_3$ represents the second thickness. Then: $H_1 \geq H_3$.

In the embodiments shown in FIG. 8, the first thickness is greater than the second thickness, $H_1 > H_3$. In some other embodiments, the first thickness may be equal to the second thickness, $H_1 = H_3$.

The first thickness is greater than the second thickness, namely, the thickness of the weak portion 21 at the weak point 2111 is greater than the maximum thickness of the weak portion 21 at other positions than the weak point 2111. The thickness of the weak portion 21 at the weak point 2111 is greater than the thickness of the weak portion 21 at other positions, and the weak point 2111 has a stronger ability to resist external impact, so as to reduce the risk of the weak portion 21 being damaged prematurely. The first thickness is equal to the second thickness, namely, the thickness of the weak portion 21 at the weak point 2111 is equal to the maximum thickness of the weak portion 21 at other positions than the weak point 2111. In this way, the thickness of the weak portion 21 is relatively more uniform, thereby facilitating processing and manufacturing.

Referring to FIG. 7 and FIG. 8, in some embodiments, the score groove 2212 includes at least one groove section, the weak portion 21 includes at least one weak section, and the at least one groove section and the at least one weak section are arranged in a one-to-one correspondence.

The score groove 2212 may include two groove sections, and the two groove sections are cross-arranged. Correspondingly, two weak sections are arranged on the weak portion 21, and the two weak sections are cross-arranged.

Referring to FIG. 7 and FIG. 8, the score groove 2212 includes three groove sections. Correspondingly, three weak sections are arranged on the weak portion 21. An arrangement form of the three weak sections is the same as that of the three groove sections.

Of course, the score groove 2212 may include more than three groove sections. Correspondingly, more than three weak sections are arranged on the weak portion 21. An arrangement form of the more than three weak sections is the same as that of the more than three groove sections.

Each time one groove section is arranged on the wall portion 221, one weak section is formed correspondingly. During manufacturing, quick forming can be achieve by stamping or milling, with operations simple and convenient and costs low.

Referring to FIG. 7 and FIG. 8, in some embodiments, the at least one weak section includes at least one first weak section 211, and the weak point 2111 is arranged on the first weak section 211. The thickness of the first weak section 211 at the weak point 2111 is the first thickness. The thickness of the first weak section 211 at other positions than the weak point 2111 is the third thickness. The first thickness is greater than or equal to the third thickness.

The at least one weak section may include one first weak section 211, two first weak sections 211, three first weak sections 211, and more than three first weak sections 211. When the at least one weak section includes a plurality of first weak sections 211, the plurality of weak sections all intersect at the weak point 2111.

Referring to FIG. 7 and FIG. 8, in the embodiments shown in FIG. 7 and FIG. 8, the at least one weak section includes one first weak section 211. The thickness of the first weak section 211 at the weak point 2111 is the first thickness, as indicated by $H_1$ in FIG. 8.

The thickness of the first weak section 211 at other positions than the weak point 2111 is the third thickness. The thickness of the first weak section 211 at other positions than the weak point 2111 may be non-uniform. For example, the thickness of the first weak section 211 at other positions than the weak point 2111 may gradually increase or decrease in an extension direction of the first weak section 211. In this case, the third thickness is the maximum thickness of the weak portion 211 at other positions than the weak point 2111. The thickness of the first weak section 211 at other positions than the weak point 2111 may be uniform, namely, the thickness of the first weak section 211 at any other position than the weak point 2111 is the same, and the thickness of the first weak section 211 at any other position than the weak point may be taken as the third thickness.

Referring to FIG. 8, the third thickness is indicated by $H_3$ in FIG. 8. In the embodiments shown in FIG. 8, the thickness of the first weak section 211 at the weak point 2111 is greater than the thickness of the first weak section 211 at other positions than the weak point 2111, namely, $H_1 > H_3$.

In some other embodiments, the thickness of the first weak section 211 at the weak point 2111 may be equal to the thickness of the first weak section 211 at other positions than the weak point 2111, namely, $H_1 = H_3$. In this case, the thickness of the first weak section 211 at other positions than the weak point 2111 represents both the third thickness and the second thickness.

The first thickness is greater than the third thickness, namely, the thickness of the first weak section 211 at the weak point 2111 is greater than the thickness of the first weak section 211 at other positions than the weak point 2111. The thickness of the first weak section 211 at the weak point 2111 is greater than the thickness of the first weak section at other positions, and therefore the weak point 2111 has a stronger ability to resist external impact, so as to reduce the risk of the weak portion 21 being damaged prematurely. The first thickness is equal to the third thickness, namely, the thickness of the first weak section at the weak point 2111 is equal to the thickness of the first weak section 211 at other positions than the weak point 2111. In this way, the thickness of the first weak section 211 is relatively more uniform, thereby facilitating processing and manufacturing.

Referring to FIG. 7 and FIG. 8, in some embodiments, the at least one weak section further includes a second weak section 212 and a third weak section 213. The second weak section 212 and the third weak section 213 are arranged opposite to each other and spaced apart. The first weak section 211 is configured to connect the second weak section 212 and the third weak section 213. The thickness of the second weak section 212 and the thickness of the third weak section 213 are both the fourth thickness, and the fourth thickness is smaller than the third thickness.

The first weak section 211, the second weak section 212, and the third weak section 213 may all be linear segments, or may all be non-linear segments, such as circular arc-shaped sections. In an embodiment where the first weak section 211, the second weak section 212, and the third weak section 213 are all linear segments, it can be understood that the first weak section 211, the second weak section 212, and the third weak section 213 all extend along a straight line, and the second weak section 212 and the third weak section 213 may be arranged in parallel or at an angle. The second weak section 212 and the third weak section 213 may both be perpendicular to the first weak section 211, or may both be non-perpendicular to the first weak section 211.

A connection position between the second weak section 212 and the first weak section 211 may be located at one end of the second weak section 212, or at a position deviating from one end of the second weak section 212. For example, the connection position between the second weak section 212 and the first weak section 211 is located at a midpoint of the second weak section 212 in an extension direction. A connection position between the third weak section 213 and the first weak section 211 may be located at one end of the third weak section 213, or at a position deviating from one end of the third weak section 213. For example, the connection position between the third weak section 213 and the first weak section 211 is located at a midpoint of the third weak section 213 in an extension direction.

The thickness of the second weak section 212 is the same as the thickness of the third weak section 213. The thickness of the second weak section 212 may be non-uniform. For example, the thickness of the second weak section 212 may gradually increase in the extension direction thereof. In this case, the fourth thickness is the maximum thickness of the second weak section 212. The thickness of the second weak section 212 may be uniform, namely, the thickness of the second weak section 212 at any position is the same, and the thickness of the second weak section 212 at any position may be taken as the fourth thickness.

Referring to FIG. 8, the fourth thickness is as indicated by $H_4$ in FIG. 8. The fourth thickness is less than the third thickness, namely, $H_4 < H_3$. In this case, the maximum thickness of the second weak section 212 is less than the minimum thickness of the first weak section 211 at any other position than the weak point.

When the battery cell 20 releases the pressure, the weak portion 21 can be opened along the first weak section 211, the second weak section 212, and the third weak section 213, forming a larger pressure relief area, which is beneficial to improve a pressure relief rate. The first weak section 211 is closer to the center of the first region 2211 than the second weak section 212 and the third weak section 213. The thickness of the first weak section 211 at other positions than the weak point 2111 may also be greater than the thickness of the second weak section 212 and the third weak section 213, thereby improving the ability of the weak portion 21 to resist external impact and reducing the risk of the weak portion 21 being damaged prematurely.

Referring to FIG. 7 and FIG. 8, in some embodiments, one end of the first weak section 211 is connected to the middle of the second weak section 212, and the other end of the first weak section 211 is connected to the middle of the third weak section 213. The weak point 2111 is located at the midpoint of the first weak section 211.

The first weak section 211 has two opposite ends, where one end is connected to the second weak section 212, and the other end is connected to the third weak section 213.

"One end of the first weak section 211 is connected to the middle of the second weak section 212" means that one end of the first weak section 211 is connected to the midpoint of the second weak section 212 or a region within 3 mm from the midpoint.

"The other end of the first weak section 211 is connected to the middle of the third weak section 213" means that the other end of the first weak section 211 is connected to the midpoint of the third weak section 213 or a region within 3 mm from the midpoint.

Referring to FIG. 7, in the embodiments shown in FIG. 7, the first weak section 211, the second weak section 212, and the third weak section 213 form an H-shaped weak portion 21. The midpoint of the first weak section 211 is the weak point 2111.

When the battery cell 20 releases the pressure, after being destroyed, the weak point 2111 can rupture along the first weak section 211 toward the second weak section 212 and the third weak section 213, respectively. After reaching a point of intersection of the first weak section 211 and the second weak section 212, the weak point ruptures from the point of intersection in the extension direction of the second weak section 212 toward both ends of the second weak section 212. After reaching a point of intersection of the first weak section 211 and the third weak section 213, the weak point ruptures from the point of intersection in the extension direction of the third weak section 213 toward both ends of the third weak section 213 to achieve fast pressure relief.

Figure 9:
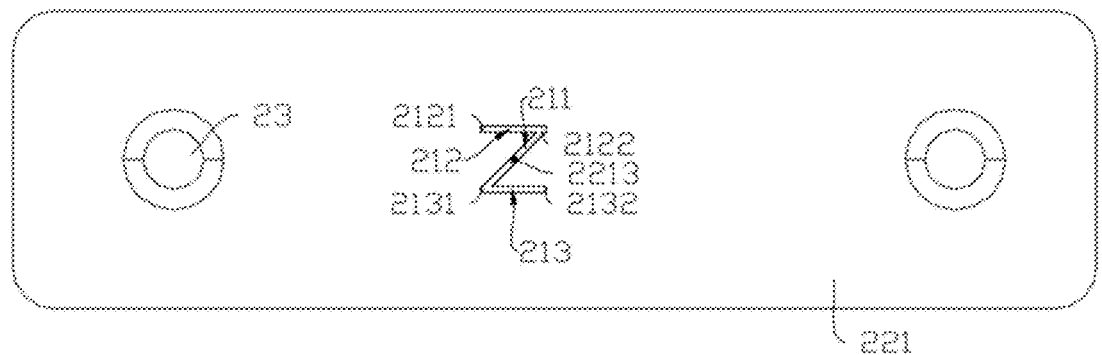
FIG. 9 is a top view of a battery cell according to yet some other embodiments of the present application.

Referring to FIG. 9, FIG. 9 is a top view of a battery cell 20 according to yet some other embodiments of the present application. In yet some other embodiments, the second weak section 212 includes a first end 2121 and a second end 2122, the third weak section 213 includes a third end 2131 and a fourth end 2132, the first end 2121 and the third end 2131 are arranged opposite to each other, and the second end 2122 and the fourth end 2132 are arranged opposite to each other. The first weak section 211 is configured to connect the first end 2121 and the fourth end 2132 or connect the second end 2122 and the third end 2131. The weak point 2111 is located at the midpoint of the first weak section 211.

The first end 2121 and the second end 2122 are two ends of the second weak section 212 in the extension direction thereof. The third end 2131 and the fourth end 2132 are two ends of the third weak section 213 in the extension direction thereof. The first end 2121 and the third end 2131 are opposite to each other, and the second end 2122 and the fourth end 2132 are opposite to each other.

The first weak section 211 is obliquely arranged, and one end of the first weak section 211 may be connected to the first end 2121. In this case, the other end of the first weak section 211 is connected to the fourth end 2132. One end of the first weak section 211 may be connected to the second end 2122, and in this case, the other end of the first weak section 211 is connected to the third end 2131. The first weak section 211, the second weak section 212, and the third weak section 213 form a Z-shaped score groove 2212. The midpoint of the first weak section 211 is the weak point 2111.

When the battery cell 20 releases the pressure, after being destroyed, the weak point 2111 can rupture along the first weak section 211 toward the second weak section 212 and the third weak section 213, respectively. After reaching the point of intersection of the first weak section 211 and the second weak section 212, the weak point ruptures from the point of intersection in the extension direction of the second weak section 212 toward the other end of the second weak section 212. After reaching the point of intersection of the first weak section 211 and the third weak section 213, the weak point ruptures from the point of intersection in the extension direction of the third weak section 213 toward the other end of the third weak section 213 to achieve fast pressure relief.

Figure 10:
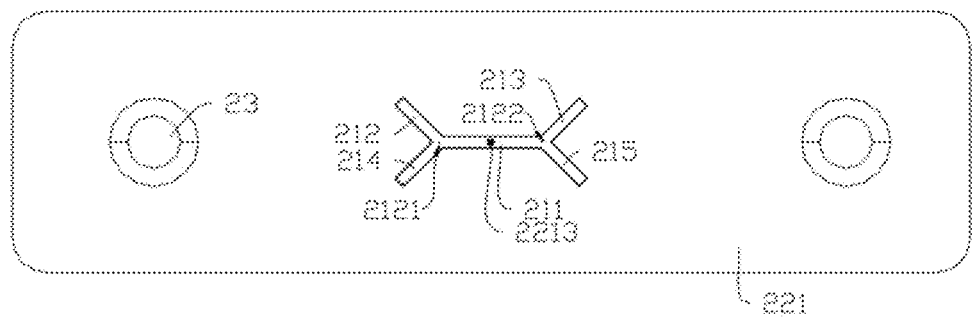
FIG. 10 is a top view of a battery cell according to still some other embodiments of the present application.

Referring to FIG. 10, FIG. 10 is a top view of a battery cell 20 according to still some other embodiments of the present application. In still some other embodiments, the at least one weak section further includes a fourth weak section 214 and a fifth weak section 215, and the fourth weak section 214 and the fifth weak section 215 are arranged opposite to each other and spaced apart. The second weak section 212 and the fourth weak section 214 intersect at the first end 2121, and the third weak section 213 and the fifth weak section 215 intersect at the second end 2122. The first weak section 211 is configured to connect the first end 2121 and the second end 2122, and the weak point 2111 is located at the midpoint of the first weak section 211.

The first weak section 211, the second weak section 212, the third weak section 213, the fourth weak section 214, and the fifth weak section 215 may all be linear segments, or non-linear segments, such as circular arc-shaped grooves. The first weak section 211, the second weak section 212, and the fourth weak section 214 intersect at the first end 2121. The first weak section 211, the third weak section 213, and the fifth weak section 215 intersect at the second end 2122. The first end 2121 and the second end 2122 are two ends of the first weak section 211 in the extension direction thereof.

When the battery cell 20 release the pressure, after being destroyed, the weak point 2111 can rupture along the first weak section 211 toward the first end 2121 and the second end 2122, respectively. After reaching the first end 2121, the weak point ruptures from the first end 2121 along the second weak section 212 and the fourth weak section 214, respectively. After reaching the second end 2122, the weak point ruptures from the second end 2122 along the third weak section 213 and the fourth weak section 214, respectively, to achieve fast pressure relief.

Figure 11:
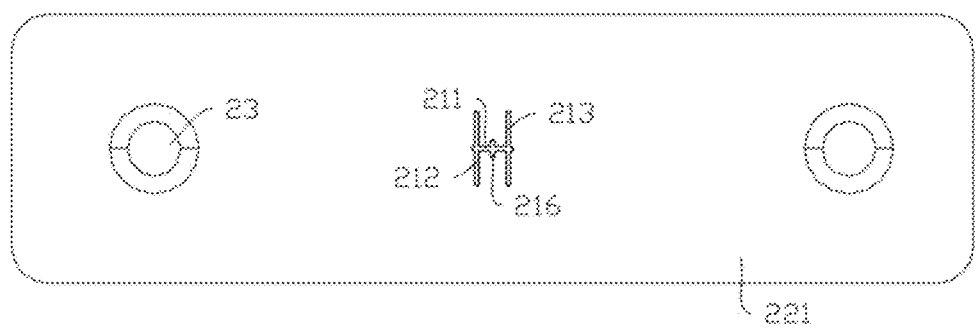
FIG. 11 is a top view of a battery cell according to some further other embodiments of the present application.

Referring to FIG. 11, FIG. 11 is a top view of a battery cell 20 according to some further other embodiments of the present application. In some further other embodiments, the at least one weak section further includes a sixth weak section 216, and the first weak section 211 and the sixth weak section 216 intersect at the weak point 2111.

The sixth weak section 216 may be a linear segment or a non-linear segment, such as a circular arc-shaped section. In an embodiment where the first weak section 211, the second weak section 212, the third weak section 213, and the sixth weak section 216 are all linear segments, it can be understood that the first weak section 211, the second weak section 212, the third weak section 213, and the sixth weak section 216 all extend along a straight line, and the second weak section 212 and the sixth weak section 216 may be arranged in parallel or at an angle. The third weak section 213 and the sixth weak section 216 may be arranged in parallel or at an angle. The first weak section 211 may be perpendicular to the sixth weak section 216 or may be non-perpendicular to the sixth weak section 216.

A connection position between the first weak section 211 and the sixth weak section 216 may be located at one end of the sixth weak section 216, or at a position deviating from one end of the sixth weak section 216. For example, the connection position between the first weak section 211 and the sixth weak section 216 is located at a midpoint of the sixth weak section 216 in an extension direction.

When the weak point 2111 serves as a point of intersection of the first weak section 211 and the sixth weak section 216, the weak point has a more concentrated stress and thus is more likely to rupture. Therefore, the thickness of the weak portion 21 at the weak point 2111 can be set larger, so that when the battery cell 20 is normally used, the weak point 2111 has a stronger ability to resist external impact, so as to reduce the risk of the weak portion 21 being damaged prematurely.

Figure 12:
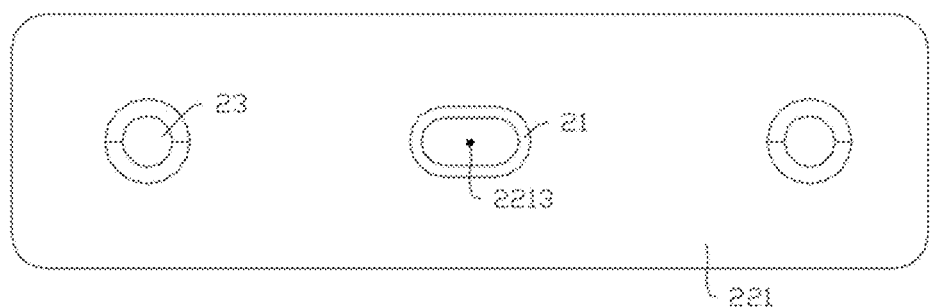
FIG. 12 is a top view of a battery cell according to yet some further other embodiments of the present application.

Referring to FIG. 12, FIG. 12 is a top view of a battery cell 20 according to yet some further other embodiments of the present application. In yet some further other embodiments, the projection of the weak portion 21 on the outer surface of the wall portion 221 is a closed structure, and the closed structure surrounds the center point 2213.

The projection of the weak portion 21 on the outer surface of the wall portion 221 may be circular, elliptical, polygonal, etc.

Referring to FIG. 12, in the embodiments shown in FIG. 12, the projection of the weak portion 21 on the outer surface of the wall portion 221 is in a runway shape. An area defined by the runway shape is relatively large, so that the weak portion 21 can form a larger opening on the wall portion 221 when the pressure is released, so as to facilitate fast pressure release.

The weak portion 21 is configured as a closed structure extending along a closed trajectory, so that when the internal pressure of the battery cell 20 reaches the fracture initiation pressure, the internal pressure can push open the weak portion 21 from all sides, forming the larger opening and allowing faster and easier pressure relief.

Referring to FIG. 11 and FIG. 12, in some embodiments, in a thickness direction of the wall portion 221, the center of the projection of the weak portion 21 coincides with the center point 2213.

In the thickness direction of the wall portion 221, the center of the projection of the weak portion 21 may be located inside the projection of the weak portion 21 or outside the projection of the weak portion 21. For example, in the thickness direction of the wall portion 221, the projection of the weak portion 21 is in the shape of a linear segment, and a midpoint of the linear segment is the center of the projection of the weak portion 21, and in this case, the center of the projection of the weak portion 21 is located inside the projection of the weak portion 21. For another example, in the thickness direction of the wall portion 221, the projection of the weak portion 21 is in the shape of a ring, and the center of the ring is the center of the projection of the weak portion 21, and in this case, the center of the projection of the weak portion 21 is located outside the projection of the weak portion 21.

In the thickness direction of the wall portion 221, the center of the weak portion 21 may coincide with the center point 2213, or may be spaced apart from the center point 2213. Both solutions can make the center of the projection of the weak portion 21 in the thickness direction coincide with the center of the projection of the center point 2213 in the thickness direction.

When the weak point 2111 coincides with the center point 2213, the weak point has the largest deformation when the battery cell 20 releases the pressure and thus is most likely to rupture. Therefore, the thickness of the weak portion 21 at the weak point 2111 can be set larger so that when the battery cell 20 is normally used, the weak point 2111 has a stronger ability to resist external impact, so as to reduce the risk of the weak portion 21 being damaged prematurely.

Figure 13:
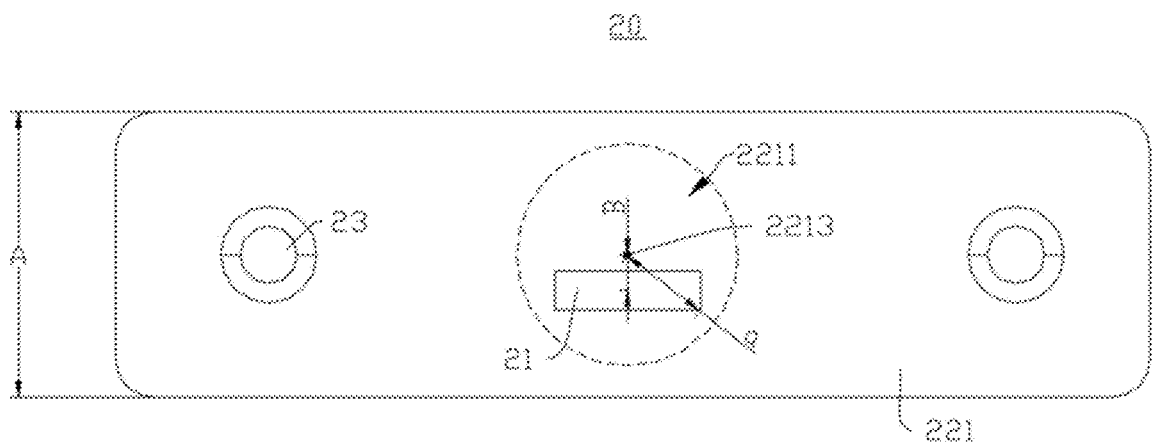
FIG. 13 is a top view of a battery cell according to still some further other embodiments of the present application.
Figure 14:
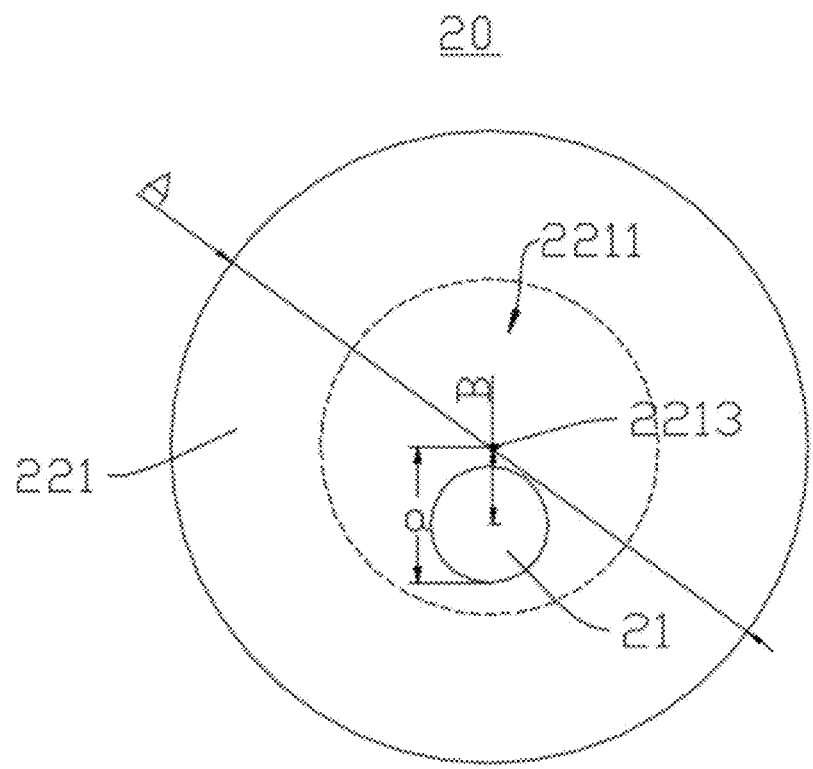
FIG. 14 is a top view of a battery cell according to yet still some further embodiments of the present application.

Referring to FIG. 13 and FIG. 14, FIG. 13 is a top view of a battery cell 20 according to still some further other embodiments of the present application. FIG. 14 is a top view of a battery cell 20 according to yet still some further embodiments of the present application. In some embodiments, in the thickness direction of the wall portion 221, the center of the projection of the weak portion 21 deviates from the center point 2213.

"In the thickness direction of the wall portion 221, the center of the projection of the weak portion 21 deviates from the center point 2213" may also be understood as: in the thickness direction of the wall portion 221, the center of the projection of the weak portion 21 does not overlap with the center point 2213. In other words, in a direction perpendicular to the thickness direction of the wall portion 221, there is a gap between the center of the projection of the weak portion 21 and the center point 2213.

By making the center of the projection of the weak portion 21 in the thickness direction deviate from the center point 2213, it is beneficial to improve the creep resistance of the weak portion 21.

Referring to Table 1, Table 1 shows the test data of creep resistance when the center of the projection of the weak portion 21 in the thickness direction deviates from the center point 2213 at different distances. In Table 1, B represents the distance at which the center of the projection of the weak portion 21 in the thickness direction deviates from the center point 2213.

This test uses 87203 square case battery cells with a capacity of 298 Ah, where the size of the battery cell 20 is: 87 mm×203 mm×112 mm, and the battery cell is a Ni50 system.

The specific test method is: press a blunt thorn head with a diameter of 20 mm on the center of the projection of the weak portion 21 in the thickness direction, and check a sinking distance of the weak portion 21 after standing for 7 days. The greater the sinking distance, the worse the creep resistance.

TABLE 1

| Experiment number | B (unit: mm) | Sinking distance (unit: mm) |
|---|---|---|
| 1 | 0 | 1.76 |
| 2 | 0.25 | 1.54 |
| 3 | 0.5 | 1.56 |
| 4 | 0.75 | 1.56 |
| 5 | 1 | 1.54 |
| 6 | 1.25 | 1.53 |
| 7 | 1.5 | 1.49 |
| 8 | 1.75 | 1.52 |
| 9 | 2 | 1.50 |
| 10 | 2.25 | 1.51 |
| 11 | 2.5 | 1.48 |
| 12 | 2.75 | 1.46 |
| 13 | 3 | 1.46 |
| 14 | 3.5 | 1.63 |
| 15 | 4 | 1.67 |
| 16 | 4.5 | 1.66 |
| 17 | 5 | 1.66 |

Referring to Table 1, it can be seen from the table that when the center of the projection of the weak portion 21 in the thickness direction deviates from the center point 2213, the creep resistance of the weak portion 21 will be better than the creep resistance when the center of the projection of the weak portion 21 in the thickness direction coincides with the center point 2213.

Referring to FIG. 13 and FIG. 14, in some embodiments, the center of the projection of the weak portion 21 in the thickness direction deviates from the center point 2213 by a distance B, which satisfies: $0 < 13 \leq 5$ mm.

The value of the distance where the center of the projection of the weak portion 21 in the thickness direction deviates from the center point 2213 can be: B3=0.1, 0.2, 0.3, 0.4, 0.5, 0.6, 0.7, 0.8, 0.9, 1, 1.1, 1.2, 1.3, 1.5, 1.7, 1.9, 2, 2.2, 2.4, 2.6, 2.8, 3, 3.5, 4, 4.5, 5, etc.

It can be seen from Table 1 that when the center of the projection of the weak portion 21 in the thickness direction coincides with the center point 2213, the sinking distance is 1.76 mm. When the distance at which the center of the projection of the weak portion 21 in the thickness direction deviates from the center point 2213 is in the range of 0-5 mm (excluding 0), the sinking distance does not exceed 1.7 mm.

Therefore, by limiting the distance at which the center of the projection of the weak portion 21 in the thickness direction deviates from the center point 2213 in the range of 0-5 mm (excluding 0), the weak portion 21 has better creep resistance.

In some embodiments, $0 < 13 \leq 3$ mm.

The value of the distance at which the center of the projection of the weak portion 21 in the thickness direction deviates from the center point 2213 can be B=0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, etc.

It can be seen from Table 1 that when 3 mm<B≤5 mm, the sinking distance is greater than 1.6. When 0<B≤3 mm, the sinking distance does not exceed 1.6. Therefore, when 0<B≤3 mm, the weak portion 21 has better creep resistance.

By limiting the distance at which the center of the projection of the weak portion 21 in the thickness direction deviates from the center point 2213 in the range of 0-3 mm (excluding 0), the weak portion 21 has better creep resistance. At the same time, the thickness of the weak portion 21 is relatively large, so that when the battery cell 20 is normally used, the weak portion 21 has a stronger ability to resist external impact, which is beneficial to reduce the risk of the weak portion 21 being damaged prematurely.

In some embodiments, the wall portion 221 includes a main body portion, and the weak portion 21 and the main body portion are integrally formed.

Integrally formed means that the weak portion 21 and the main body portion are an integral structure when provided. For example, the weak portion 21 may be formed on the wall portion 221 by stamping or cold heading or the like.

Integrally forming the weak portion 21 with the main body portion can improve the stiffness of the weak portion 21, so that the weak portion 21 has a stronger ability to resist creep and impact of an electrolytic solution, which is beneficial to prolong the service life of the weak portion 21 and reduce the risk of liquid leakage occurring to the weak portion 21.

In some embodiments, the hardness of the weak portion 21 is greater than that of the main body portion.

The weak portion 21 can be formed by stamping, so that the weak portion 21 will undergo cold work hardening (the grain arrangement changes, resulting in lattice distortion, reducing the metal plasticity, and increasing the material hardness). The hardness of the weak portion 21 will be greater than the hardness of the main body portion, so that the weak portion has an enhanced ability to resist external impact, and is not likely to be damaged by external impact. In addition, the weak portion 21 has an enhanced ability to resist fatigue and is less likely to fail due to fatigue.

In some other embodiments, the wall portion 221 includes a main body portion and a pressure relief mechanism, and the pressure relief mechanism is arranged separately from the main body portion and connected thereto. The weak portion 21 is arranged on the pressure relief mechanism, and an outer surface of the main body portion is the outer surface of the wall portion 221.

"The pressure relief mechanism is arranged separately from the main body portion and connected thereto" means that the pressure relief mechanism and the main body portion are provided separately and are connected together in the end. For example, the pressure relief mechanism may be welded to the main body portion. In this case, the pressure relief mechanism may protrude from the outer surface of the main body portion. In this case, the outer surface of the main body portion serves as the outer surface of the wall portion 221.

The pressure relief mechanism is arranged separately from the main body portion and installed on the main body portion, so as to facilitate processing and manufacturing.

Figure 15:
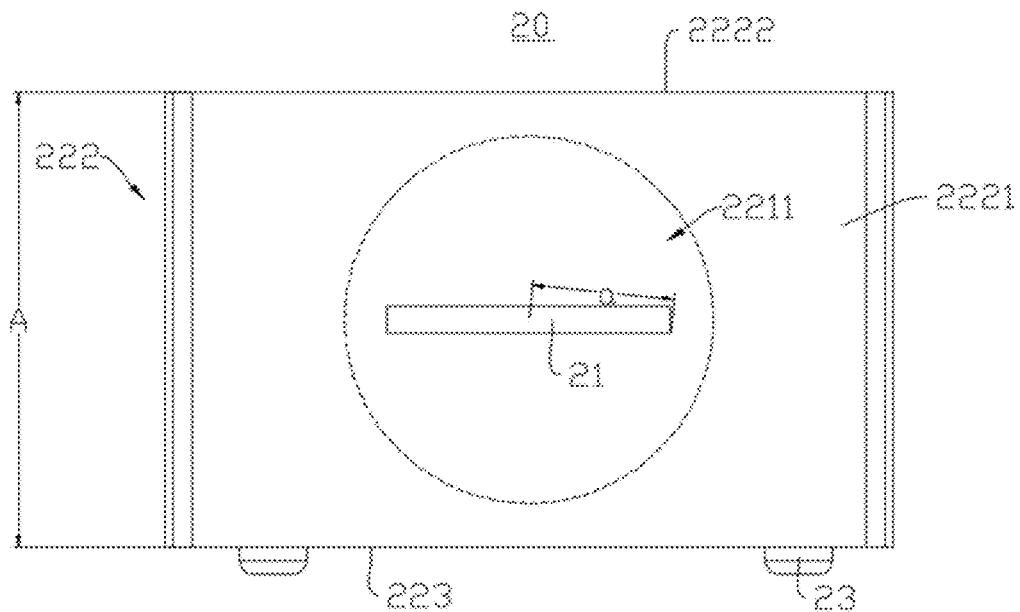
FIG. 15 is a side view of a battery cell according to yet still some other embodiments of the present application.
Figure 16:
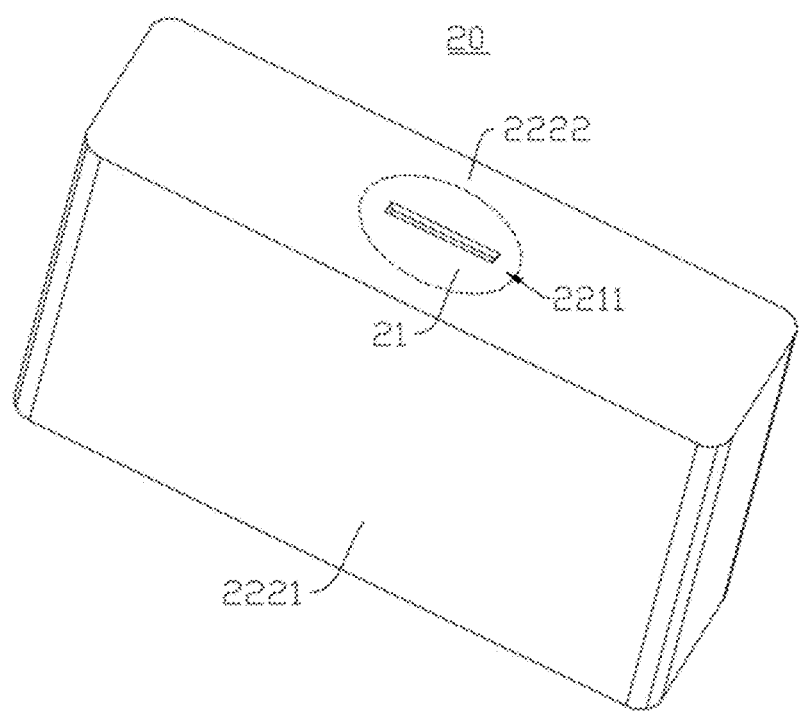
FIG. 16 is a schematic structural view of a battery cell according to yet still some further other embodiments of the present application.

Referring to FIG. 13, FIG. 15, and FIG. 16, FIG. 15 is a side view of a battery cell 20 according to yet still some other embodiments of the present application. FIG. 16 is a schematic structural view of a battery cell 20 according to yet still some further other embodiments of the present application. In some embodiments, the shell 22 includes a case 222 and an end cover 223, the case 222 has an opening, and the end cover 223 closes the opening and is fixed to the case 222. The wall portion 221 is the end cover 223 or a wall of the case 222.

Referring to FIG. 13, in the embodiments shown in FIG. 13, the end cover 223 is the wall portion 221.

Referring to FIG. 15, in the embodiments shown in FIG. 15, the case 222 includes an integrally formed side wall 2221 and bottom wall 2222. The side wall 2221 is arranged on all sides of the bottom wall 2222 in a defining manner, and in a thickness direction of the bottom wall 2222, one end of the side wall 2221 is connected to the bottom wall 2222, and the other end thereof forms an opening in a defining manner. The end cover 223 closes the opening. The side wall 2221 is the wall portion 221.

When the case 222 is provided, the side wall 2221 and the bottom wall 2222 are of an integral structure. The side wall 2221 and the bottom wall 2222 may be integrally formed by stamping or casting. One end of the side wall 2221 is connected to the bottom wall 2222, and the other end of the side wall 2221 is connected to the end cover 223. In the thickness direction of the end cover 223, the bottom wall 2222 and the end cover 223 are arranged opposite to each other.

Referring to FIG. 16, in the embodiments shown in FIG. 16, the shell 22 includes a case 222 and an end cover 223. The case 222 includes an integrally formed side wall 2221 and bottom wall 2222. The side wall 2221 is arranged on all sides of the bottom wall 2222 in a defining manner, and in a thickness direction of the bottom wall 2222, one end of the side wall 2221 is connected to the bottom wall 2222, and the other end thereof forms an opening in a defining manner. The end cover 223 closes the opening. The bottom wall 2222 is the wall portion 221.

The thickness of the bottom wall 2222 is usually larger, but the bottom wall is also more susceptible to external impact. Therefore, by arranging the weak portion 21 in the first region 2211 of the bottom wall 2222 to increase the thickness of the weak portion 21, when the battery cell 20 is normally used, the weak portion 21 has a stronger ability to resist external impact, which is beneficial to reducing the risk of the weak portion 21 being opened prematurely.

The wall portion 221 may be the end cover 223, or the bottom wall 2222 of the case 222, or the side wall 2221 of the case 222, and the weak portion 21 is arranged in the first region 2211 of the end cover 223, the bottom wall 2222 or the side wall 2221. Under the condition of the same fracture initiation pressure, the thickness of the weak portion 21 arranged in the first region 2211 can be larger. In this way, when the battery cell 20 is normally used, the weak portion 21 has a stronger ability to resist external impact, which is helpful to reduce the risk of the weak portion 21 being damaged prematurely.

An embodiment of the present application further provides a battery 100. The battery 100 includes the above battery cell 20.

An embodiment of the present application further provides an electrical device. The electrical device includes the above battery 100. The battery 100 is configured to provide electrical energy for the electrical device.

According to some embodiments of the present application, reference can be made to FIG. 3 to FIG. 16.

Embodiments of the present application provides a battery cell 20, where the battery cell 20 includes a shell 22, the shell 22 has a wall portion 221, the wall portion 221 includes a weak portion 21, the weak portion 21 is configured to be destroyed when the battery cell 20 releases internal pressure, and an outer surface of the wall portion 221 has a center point 2213. A maximum distance between a projection of the weak portion 21 on the outer surface of the wall portion 221 and the center point 2213 is a, the minimum radial dimension of the outer surface of the wall portion 221 is A, a and A satisfy: a≤0.4A, and the radial direction refers to a direction passing through the center point 2213. By setting a≤0.4A, namely, the maximum distance between the projection of the weak portion 21 on the outer surface of the wall portion 221 and the center point 2213 of the outer surface of the wall portion 221 is less than or equal to 0.4 times the minimum radial dimension of the outer surface of the wall portion 221, the weak portion 21 is arranged in the first region 2211, with a relatively small stiffness, of the wall portion 221. The first region 2211 is a circular region with the center point 2213 of the outer surface of the wall portion 221 as a circle center and 0.4 times the minimum radial dimension of the outer surface of the wall portion 221 as a radius. The first region 2211 is close to the center of the wall portion 221, and the first region 2211 is a region, with a relatively small stiffness, of the wall portion 221 and thus has a relatively weak ability to resist deformation. When the battery cell 20 releases the internal pressure, the first region 2211 undergoes a large deformation under the action of gas, and therefore the weak portion 21 arranged in the first region 2211 is easily deformed and damaged. Therefore, under the condition of the same fracture initiation pressure, the thickness of the weak portion 21 arranged in the first region 2211 can be larger. In this way, when the battery cell 20 is normally used, the weak portion 21 has a stronger ability to resist external impact, which is beneficial to reduce the risk of the weak portion 21 being damaged prematurely. Furthermore, the thicker the weak portion 21 is, the easier it is to manufacture, and the lower the precision requirement for a manufacturing device.

The wall portion 221 is provided with a score groove 2212, and the weak region 21 is formed at a bottom of the score groove 2212. The weak portion 21 is formed by forming the score groove 2212 in the wall portion 221, with operation simple and convenient and costs low.

The projection of the weak portion 21 on the outer surface of the wall portion 221 passes through the center point 2213. When the battery cell 20 releases the internal pressure, the center point 2213 is a position, with the largest deformation, of the wall portion 221 and is most likely to be damaged. By making the projection of the weak portion 21 on the outer surface of the wall portion 221 pass through the center point 2213, the thickness of the weak portion 21 at the center point 2213 can be larger. In this way, when the battery cell 20 is normally used, the weak portion 21 has a stronger ability to resist external impact, so as to reduce the risk of the weak portion 21 being damaged prematurely.

The weak portion 21 has a weak point 2111 arranged corresponding to the center point 2213, the thickness of the weak portion 21 at the weak point 2111 is a first thickness, and the maximum thickness of the weak portion 21 at other positions than the weak point 2111 is a second thickness. The first thickness is greater than or equal to the second thickness. The first thickness is greater than the second thickness, namely, the thickness of the weak portion 21 at the weak point 2111 is greater than the maximum thickness of the weak portion 21 at other positions than the weak point 2111. The thickness of the weak portion 21 at the weak point 2111 is greater than the thickness of the weak portion 21 at other positions, and the weak point 2111 has a stronger ability to resist external impact, so as to reduce the risk of the weak portion 21 being damaged prematurely. The first thickness is equal to the second thickness, namely, the thickness of the weak portion 21 at the weak point 2111 is equal to the maximum thickness of the weak portion 21 at other positions than the weak point 2111. In this way, the thickness of the weak portion 21 is relatively more uniform, thereby facilitating processing and manufacturing.

The above descriptions are merely preferred embodiments of the present application and are not intended to limit the present application. For those skilled in the art, the present application may have various modifications and changes. Any modification, equivalent replacement, improvement, etc. made within the spirit and principle of the present application shall fall within the scope of protection of the present application.

What is claimed is:

1. A battery cell, comprising:
   a shell having a wall portion, wherein the wall portion comprises a weak portion, the weak portion is configured to be destroyed when the battery cell releases internal pressure, and an outer surface of the wall portion has a center point; and
   a maximum distance between a projection of the weak portion on the outer surface of the wall portion and the center point is a, the minimum radial dimension of the outer surface of the wall portion is A, a and A satisfy: a≤0.4A, and the radial direction refers to a direction passing through the center point.

2. The battery cell according to claim 1, wherein the wall portion is provided with a score groove, and the weak portion is formed at a bottom of the score groove.

3. The battery cell according to claim 2, wherein the projection of the weak portion on the outer surface of the wall portion passes through the center point.

4. The battery cell according to claim 3, wherein the weak portion has a weak point arranged corresponding to the center point, the thickness of the weak portion at the weak point is a first thickness, the maximum thickness of the weak portion at other positions than the weak point is a second thickness, and the first thickness is greater than or equal to the second thickness.

5. The battery cell according to claim 4, wherein the score groove comprises at least one groove section, the weak portion comprises at least one weak section, and the at least one groove section and the at least one weak section are arranged in a one-to-one correspondence.

6. The battery cell according to claim 5, wherein the at least one weak section comprises at least one first weak section, the weak point is arranged on the first weak section, the thickness of the first weak section at the weak point is the first thickness, the thickness of the first weak section at other positions than the weak point is a third thickness, and the first thickness is greater than or equal to the third thickness.

7. The battery cell according to claim 6, wherein the at least one weak section further comprises a second weak section and a third weak section, the second weak section and the third weak section are arranged opposite to each other and spaced apart, the first weak section is configured to connect the second weak section and the third weak section, the thickness of the second weak section and the thickness of the third weak section are both a fourth thickness, and the fourth thickness is less than the third thickness.

8. The battery cell according to claim 7, wherein one end of the first weak section is connected to a middle of the second weak section, the other end of the first weak section is connected to a middle of the third weak section, and the weak point is located at a midpoint of the first weak section.

9. The battery cell according to claim 7, wherein the second weak section comprises a first end and a second end, the third weak section comprises a third end and a fourth end, the first end and the third end are arranged opposite to each other, the second end and the fourth end are arranged opposite to each other, the first weak section is configured to connect the first end and the fourth end or connect the second end and the third end, and the weak point is located at the midpoint of the first weak section.

10. The battery cell according to claim 7, wherein the at least one weak section further comprises a fourth weak section and a fifth weak section, the fourth weak section and the fifth weak section are arranged opposite to each other and spaced apart, the second weak section and the fourth weak section intersect at the first end, the third weak section and the fifth weak section intersect at the second end, the first weak section is configured to connect the first end and the second end, and the weak point is located at the midpoint of the first weak section.

11. The battery cell according to claim 8, wherein the at least one weak section further comprises a sixth weak section, and the first weak section and the sixth weak section intersect at the weak point.

12. The battery cell according to claim 1, wherein the projection of the weak portion on the outer surface of the wall portion is a closed structure, and the closed structure surrounds the center point.

13. The battery cell according to claim 1, wherein in a thickness direction of the wall portion, the center of the projection of the weak portion coincides with the center point.

14. The battery cell according to claim 1, wherein in the thickness direction of the wall portion, the center of the projection of the weak portion deviates from the center point.

15. The battery cell according to claim 14, wherein a distance at which the center of the projection of the weak portion in the thickness direction deviates from the center point is B, which satisfies: $0<B\leq 5$ mm.

16. The battery cell according to claim 1, wherein the wall portion comprises a main body portion, and the weak portion and the main body portion are integrally formed.

17. The battery cell according to claim 16, wherein the hardness of the weak portion is greater than that of the main body portion.

18. The battery cell according to claim 1, wherein the wall portion comprises a main body portion and a pressure relief mechanism, the pressure relief mechanism is arranged separately from the main body portion and connected thereto, the weak portion is arranged on the pressure relief mechanism, and an outer surface of the main body portion is the outer surface of the wall portion.

19. A battery, comprising the battery cell according to claim 1.

20. An electrical device, comprising the battery according to claim 19, wherein the battery is configured to provide electrical energy for the electrical device.

* * * * *